United States Patent
Metzech et al.

(10) Patent No.: US 8,985,828 B2
(45) Date of Patent: Mar. 24, 2015

(54) FLAT ILLUMINATING DISPLAY DEVICE AND LIGHT-EMITTING MEANS THEREFOR

(75) Inventors: Sabine Metzech, Delmenhorst (DE); Karsten Hesse, Bremen (DE); Angelo Librizzi, Lüdenscheid (DE); Jörg Günther, Lüdenscheid (DE)

(73) Assignee: Airbus Operations GmbH (DE)

(*) Notice: Subject to any disclaimer, the term of this patent is extended or adjusted under 35 U.S.C. 154(b) by 203 days.

(21) Appl. No.: 13/566,420

(22) Filed: Aug. 3, 2012

(65) Prior Publication Data

US 2013/0016525 A1 Jan. 17, 2013

Related U.S. Application Data

(63) Continuation of application No. PCT/EP2011/051447, filed on Feb. 2, 2011.

(60) Provisional application No. 61/301,378, filed on Feb. 4, 2010.

(30) Foreign Application Priority Data

Feb. 4, 2010 (DE) .................... 10 2010 006 915

(51) Int. Cl.
```
G09F 13/18    (2006.01)
B64D 11/00    (2006.01)
F21V 8/00     (2006.01)
G09F 13/16    (2006.01)
G09F 21/10    (2006.01)
B64D 45/00    (2006.01)
G09F 21/04    (2006.01)
G09F 13/22    (2006.01)
```

(52) U.S. Cl.
CPC ............ *G09F 13/18* (2013.01); *B64D 11/0015* (2013.01); *G02B 6/0091* (2013.01); *G09F 13/16* (2013.01); *G09F 21/10* (2013.01); *B64D 2045/007* (2013.01); *G02B 6/0043* (2013.01); *G02B 6/006* (2013.01); *G09F 21/045* (2013.01); *G09F 2013/222* (2013.01)
USPC .......... 362/602; 362/23.17; 362/616; 362/613

(58) Field of Classification Search
USPC .............. 362/602, 23.16–23.17, 26, 27, 362, 362/364, 495, 545, 546, 559, 565–566, 610, 362/612–612, 615–616, 618, 620, 632, 800, 362/812
See application file for complete search history.

(56) References Cited

U.S. PATENT DOCUMENTS

| | | |
|---|---|---|
| 3,752,974 A | 8/1973 | Baker et al. |
| 5,027,258 A | 6/1991 | Schoniger et al. |

(Continued)

FOREIGN PATENT DOCUMENTS

| | | |
|---|---|---|
| DE | 3919925 A1 | 12/1990 |
| DE | 29711377 U1 | 9/1997 |
| DE | 19703195 A1 | 8/1998 |
| DE | 10311335 A1 | 10/2004 |
| DE | 102008012844 A1 | 6/2009 |

(Continued)

*Primary Examiner* — Anne Hines
(74) *Attorney, Agent, or Firm* — Lerner, David, Littenberg, Krumholz & Mentlik, LLP

(57) ABSTRACT

Flat illuminating display device with light emitting means to illuminate a film for display of an image applied to a display area, wherein the light emitting means are embodied as at least one light coupling unit arranged laterally at a translucent film thus forming a light duct, wherein the light such fed into the adjacent edge area into the film is reflected by a reflective layer, which is applied on at least one side, to homogeneously spread within the film, wherein a reflection screen to obtain a light emission is provided opposite of the display area to create said display area.

8 Claims, 2 Drawing Sheets

(56) References Cited

U.S. PATENT DOCUMENTS

Figure 1:
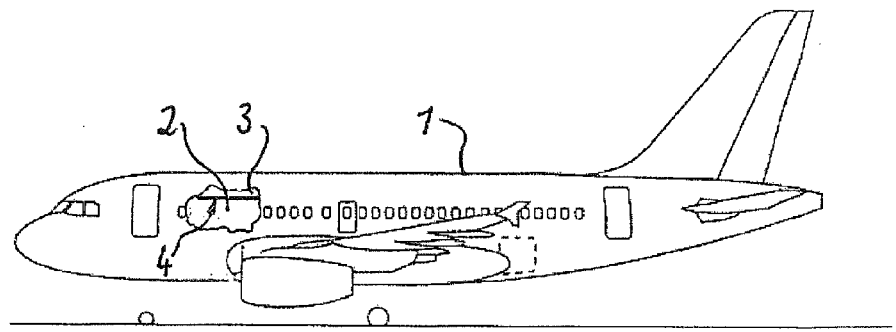

2004/0130912 A1  7/2004  Miyashita
2005/0072032 A1  4/2005  McCollum et al.
2009/0251920 A1* 10/2009 Kino et al. .................... 362/602

FOREIGN PATENT DOCUMENTS

| EP | 1458221 B1 | 7/2008 |
| JP | 10-247412 A | 9/1998 |
| WO | 2005001892 A2 | 1/2005 |

* cited by examiner

FLAT ILLUMINATING DISPLAY DEVICE AND LIGHT-EMITTING MEANS THEREFOR

CROSS-REFERENCE TO RELATED APPLICATIONS

The present application is a continuation of International Application No. PCT/EP2011/051447, filed Feb. 2, 2011, published in German, which claims priority from German Application No. 10 2010 006 915.9 filed Feb. 4, 2010, and which claims the benefit of the filing date of U.S. Provisional Patent Application No. 61/301,378 filed on Feb. 4, 2010, the disclosures of which are hereby incorporated herein by reference.

AREA OF THE INVENTION

The invention relates to a flat illuminating display device comprising light-emitting means for illumination of a film to display an image applied to a display area. Further, the invention also relates to a particularly embodied light-emitting means within the framework of said illuminating display device. In addition, the invention relates to a commercial aircraft which is equipped with said flat illuminating display device in the area of the passenger cabin.

The area of application of the illuminating display device according to the invention, however, is not restricted to the area of aircraft construction. In addition, it is also conceivable to apply said illuminating display device in the automotive industry, home appliances, and similar areas, for example, to create backlit signs, backlit pictures in walls or in advertisements. It is also possible to create symbol and functional lighting in switches and similar operator controls. The illuminating display device of the kind of interest here may particularly be applied for large-scale backlit display areas.

BACKGROUND OF THE INVENTION

DE 297 11 377 U1 discloses an illuminating display device, which essentially comprises a reflector insert having a translucent protective cover, wherein the reflector insert backlits the protective cover in order to display images applied thereto. The reflector insert is provided with particular break-off illuminating zones and with concave reflector segments. Receivers for illuminating means and snap-in noses for fastening the reflector insert are moulded within it. This illuminating display device has the disadvantage that quite a considerable component thickness results from the curved reactor segments that are arranged behind the protective cover, which requires a corresponding installation space. Therefore, said illuminating display device cannot be inserted into thin walls without that the rear part of the reflector insert protrudes from the wall.

DE 103 11 335 A1 discloses a particularly flat illuminating display device, which is embodied as a synthetic moulded part which does not require a rear reflector insert. A synthetic base body and a film of synthetic material, which at least partly covers the synthetic base body hereby encloses an electroluminescent functional layer and a coloured translucent layer, wherein the translucent layer can be radiated by light that was generated in the electroluminescent functional layer. In doing so, a coloured, light impermeable layer having an opening embodied as an image is provided at the surface of the synthetic film that is facing away from the synthetic base body, by which a disappearing effect of the image is achieved when the light is switched off. Said disappearing effect creates a completely closed two-dimensional impression when said flat illuminating display device is not switched on. The image to be displayed will only become visible when the electroluminescent functional layer is illuminated. Because of the synthetic base body that fulfils a carrier function, said technical solution, however, still appears to be quite thick for particularly flat applications and the display surface obtainable by it possesses a level embodiment and, in addition, is inflexible. Thus said illuminating display device cannot follow a curved surface.

The technical solution disclosed in DE 197 03 195 A1 has the same disadvantages, because a plurality of inflexible display plates are stacked upon one another like a sandwich. A different image to be displayed is inserted into every display plate, which is activated by a light source arranged laterally at the display plates that are stacked upon one another. To this end, the inserted images are embodied as scatter centers, which allow the light, which is entering at the side of the display plates, to be emitted by means of scattering towards the display area. As the light source comprises individual rod-shaped lamps allocated to each display plate, said light-emitting means is constructed quite elaborately.

SUMMARY OF THE INVENTION

An embodiment of the present invention includes a particularly flat illuminating display device, which is particularly thin and flexible and which allows a homogeneous illuminating display of an image on a display area with technically simple light-emitting means.

An aspect of the invention includes the technical teaching according to which, in a flat illuminating display device, the light-emitting means are embodied as a light-coupling unit arranged laterally at the translucent film which forms a light duct, wherein the light fed into the film through the adjacent edge area can additionally be reflected by a reflective layer applied at least on one side in order to spread within the film particularly homogeneously, wherein, in order to create a light-emission area at the display area, a reflection screen is applied opposite to it to generate an emission of light.

The advantage of the solution according to an aspect of the invention is particularly the fact that the display area for the image comprises a flexible film, which is embodied in a particularly thin quality. Experiments have shown that warning signs of at least roughly post-card size can be manufactured by means of translucent films having a layer thickness of approximately 0.5 mm Due to the flexibility of the film, display areas can be obtained which are adapted to curved contours of surfaces. The light coupling unit according to an embodiment of the invention allows a space-saving lateral feeding in of light into the thin film. By means of the light coupling optics according to the invention, light can be fed into the thin film although the light emission area of the light source is greater than the film thickness. Thus the light of the light source is bundled onto the film thickness. In addition, by means of the light coupling unit, light is fed into the film such that it hits the film surface at an optically favourable angle to provide a light duct. The light duct and the coupling out of light are applied to the film in a simple manner by means of coating technology. This way, an efficient production of display areas of different sizes with any conceivable kind of images can be obtained, which can be embodied as, for example, pictures, pictograms, symbols, or writing.

In order to obtain a particularly homogeneous spreading of light within the film, which emanates from the lateral feeding in of light, it is proposed, according to a measure of the present invention, to apply the reflective layer at least on one side by direct metallization of the film. For example, chromium may be used for direct metallization, which yields a particularly effective reflective layer. The reflective layer is applied to the surface parts of the film, which are not occupied by the reflection screen, or by the display area allowing an emission of light, or by the image applied thereto. As an alternative to direct metallization it is, however, also conceivable to apply the reflective layer by printing a mirror-effect colour onto the film.

The image arranged within the range of the display area is, preferably, directly applied to the film using an at least partly translucent colour. This may also be obtained by printing. As an alternative, it is also possible to use a second cover film comprising the at least partly translucent image and to apply it to the light-guiding film, for example, by laying it on top. By means of this measure images to be displayed can be exchanged in a simple manner.

According to a measure of the present invention, it is proposed to cover the image by a semi-translucent colour layer applied to the display area. In doing so, said semi-translucent colour layer serves the achievement of what is referred to as a disappearing effect. The disappearing effect works such that the image to be displayed is not, or only barely, visible from the outside when the light coupling unit is not switched on. The observer sees a continuously homogeneous surface, which in many cases is also shining. As soon as the light coupling unit is switched on, the image lights up from the homogeneous surface. The film, which is coated differently, according to the invention, thus allows to provide a display area equipped with the disappearing effect during lateral feeding in of light.

An optically critically point during the light coupling process is the transition from the light coupling unit to the film. At this point, the film is, preferably, particularly cut out to guarantee that it adapts its form to the geometry of the light coupling unit, which—depending on the desired optical effect—may be embodied in very different manners.

According to another measure of the present invention, it is proposed that the film consisting of a translucent synthetic material is to be blanked by a steel strip tool. As an alternative to this it is also conceivable to use a cutting tool comprising a punch and a die. Experiments have shown that said production step creates cutting edges that are plane to an extremely high extent, and that they do not obstruct the transfer of light into the film.

According to another measure of the present invention, it is proposed to embody the light-emitting means as a laterally connectable light coupling unit by means of clamping bars to the translucent film having a translucent carrier unit. Said carrier unit may consist of an injection-moulded synthetic material. The clamping bars, which alternating have a clamping effect onto the upper and lower side of the film, allow a simple and releasable connection with the film and, therefore, a particularly easy assembly or disassembly.

To feed in the light into the film, the carrier unit of the light coupling unit possesses, preferably, at least one optical surface, which is moulded at the carrier unit and aligned mirror-finished in the direction of the two-dimensional surface of the film, particularly, in the framework of a cut-out to be preferably arranged there. Said optical surface may be embodied, for example, by means of straight or curved edges to illuminate the two-dimensional area.

According to another measure of the present invention, at least one electric light-emitting diode serves as a radiation source, which is arranged opposite the optical surface at the carrier unit and which emits light in the direction of the optical surface. Preferably, at least one light-emitting diode can be mounted to a circuit board and electrically connected, which again is fastened to a resting bar moulded to the carrier unit. The connection can, for example, be embodied as a clip connection.

SHORT DESCRIPTION OF THE FIGURES

Figure 2:
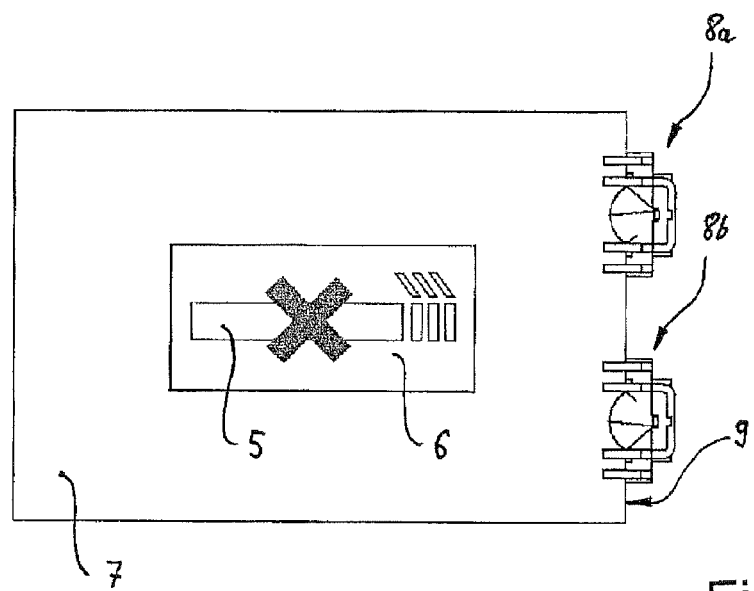
Figure 3:
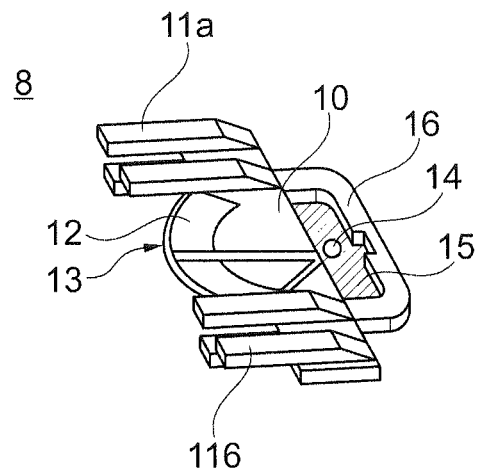
Figure 4:
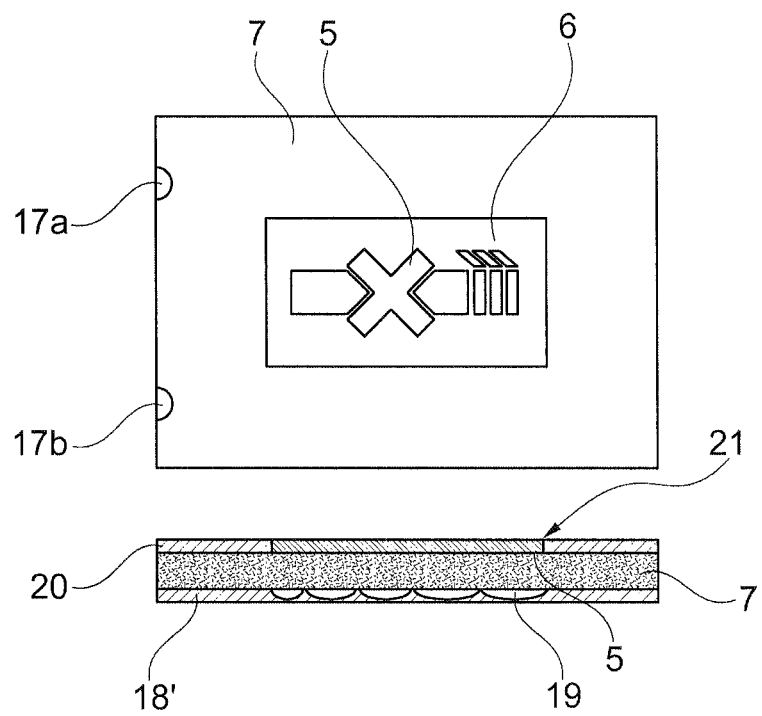

Further aspects of the present invention are described in more detail in the following together with a description of a preferred example of embodiment by means of the Figures. The following is shown:

FIG. 1 the lateral view of a commercial aircraft with an illuminating display device integrated into the cabin as a warning sign, FIG. 2 a top view onto the illuminating display device according to FIG. 1, FIG. 3 a perspective view of the optical light coupling unit of the illuminating display device, and FIG. 4 a schematic representation of the layers of the film forming the display area.

DETAILED DESCRIPTION OF EXEMPLARY EMBODIMENTS

According to FIG. 1, the commercial aircraft comprises a passenger cabin (2) integrated into a fuselage (1), in which cabin equipment (3) is integrated in the form of overhead storage units arranged above the seat rows, the lower visible surface area of which is equipped with an illuminating display device in the form of a warning sign. Said warning sign may, if required, particularly during the starting and landing processes, be illuminated from the rear such that a coloured image lights up thus illuminating the warning.

According to FIG. 2, said image (5) is embodied as a non-smoking sign in the present example of embodiment. The image (5) is located on a display area (6) of a synthetic film (7). On the side of the synthetic film (7) two light coupling units (8a, 8b) are arranged disposed spaced apart from one another. Through the adjacent edge area (9) light emitted from said light coupling unit (8a, 8b) is fed into the translucent film (7) that is forming a light duct.

According to FIG. 3, the light coupling unit (8) used therefor comprises a carrier unit (10), which consists of an injection-moulded synthetic material. At the carrier unit (10) two groups of clamping bars (11a) and (11b) are arranged, which allow the connection of the film that is not further shown here. Between the two groups of clamping bars (11a) and (11b) a mirror-finished optical area (12) is arranged, which is moulded at it and serves the purpose of a light duct. The optical area (12) is aligned in the direction of the two-dimensional surface of the film resting on it adjacent thereto and serves the possibly homogeneous lateral feeding in of the light into the film. To this end, the optical area (12) comprises a front edge (13).

One or a plurality of electric light-emitting diodes (14) serves as a source of light for the light coupling unit (8), which is arranged opposite the curved edge (13) of the optical area (12) and emits the light in this direction. The light emitting diodes (14) are assembled on a circuit board (15) and electrically connected via said plate. The circuit board (15) is fastened to a resting bar (16) which is moulded at the carrier unit (10).

According to FIG. 4, a display area (6) is arranged on the film (7), which illuminates an image (5). In order to guarantee a homogeneous dispersion of light of the light fed in laterally through the coupling points (17a) and (17b) via the light coupling units, which are not further shown here, the film (7) outside of the display area (6) is equipped with a reflective layer (18), which reflects the light and guarantees its homogeneous dispersion within the film (7). In order to generate the display area (6) on the one side of the film (7), a reflection screen (19) is applied onto the film (7) opposite to it. The reflection screen (19) represents a field applied by screen printing leading to a diffuse reflection. In doing so, the light located within the film (7) is reflected and emitted diffusely from the film (7) at the opposite side within the area of the display area (5). In this example of embodiment, the partly translucent image (5) is applied to the film (7) through a cover film (20) comprising it, and is therefore exchangeable. To put into practice said disappearing effect, the image (5) is coated at least in the area of the display area (6) with a semi-translucent colour layer (21).

In addition it must be pointed out that "comprising" does not exclude any other elements or steps, and that "one" does not exclude any plurality. It is further pointed out that features or steps, which are described with reference to any of the above examples of embodiment, may also be used in combination with other features or steps of other examples of embodiment described above. Reference signs in the claims are not to be regarded as restrictions.

LIST OF REFERENCE SIGNS

1 Fuselage
2 Passenger cabin
3 Cabin equipment
4 Surface area
5 Image
6 Display area
7 Film
8 Light coupling unit
9 Edge area
10 Carrier unit
11 Clamping bar
12 Surface
13 Edge
14 Light-emitting diode
15 Circuit board
16 Resting bar
17 Coupling point
18 Reflective layer
19 Reflection screen
20 Cover film
21 Colour layer

The invention claimed is:

1. A flat illuminating display device, comprising light-emitting means for illumination of a film to display an image applied to a display area,
    wherein the light-emitting means are embodied as at least one light coupling unit laterally arranged at a translucent film forming a light duct,
    wherein the light fed into the film through the adjacent edge area is reflected in the film to homogeneously spread within the film and a reflection screen provided across the display area, to create a light emission,
    wherein the reflection screen represents a field leading to a diffuse reflection, and
    wherein the light located within the film is reflected and emitted diffusely from the film at the opposite side within the area of the display area.

2. The flat illuminating display device according to claim 1, further comprising
    a reflective layer applied at least on one side of the film to improve the reflection properties.

3. The flat illuminating display device according to claim 1, wherein
    the reflective layer is applied by printing of a mirror-effect colour onto the film or by direct metallization of the film.

4. The flat illuminating display device according to claim 1, wherein
    the image applied to the display area of the film comprises at least partly translucent colour.

5. The flat illuminating display device according to claim 1, further comprising
    a second cover film, comprising an at least partly translucent image, applied to the film.

6. The flat illuminating display device according to claim 1, wherein
    the image is covered with a semi-translucent colour layer applied to the display field to achieve a disappearing effect.

7. The flat illuminating display device according to claim 1, wherein
    the film comprises a translucent synthetic material and is blanked by means of a steel strip tool to obtain plane cutting edges.

8. A commercial aircraft comprising a large-volume fuselage having a passenger cabin, the cabin equipment of the passenger cabin comprising visible exterior surface areas for display purposes, the surface area are equipped with a flat illuminating display device, the display device comprising:
    light-emitting means for illumination of a film to display an image applied to a display area,
    wherein the light-emitting means are embodied as at least one light coupling unit laterally arranged at a translucent film forming a light duct,
    wherein the light fed into the film through the adjacent edge area is reflected in the film to homogeneously spread within the film, and a reflection screen provided across a display area to create a light emission,
    wherein the reflection screen represents a field leading to a diffuse reflection, and
    wherein the light located within the film is reflected and emitted diffusely from the film at the opposite side within the area of the display area.

* * * * *